United States Patent
Breyer et al.

(10) Patent No.: US 9,765,526 B2
(45) Date of Patent: Sep. 19, 2017

(54) HEAT PANEL AND FASTENER SYSTEM

(71) Applicant: All Weather Armour, LLC, Sullivan, WI (US)

(72) Inventors: Scott Breyer, Dousman, WI (US); David Catherman, Madison, WI (US)

(73) Assignee: All Weather Armour, LLC, Sullivan, WI (US)

( * ) Notice: Subject to any disclaimer, the term of this patent is extended or adjusted under 35 U.S.C. 154(b) by 0 days.

(21) Appl. No.: 14/964,802

(22) Filed: Dec. 10, 2015

(65) Prior Publication Data

US 2016/0168858 A1 Jun. 16, 2016

Related U.S. Application Data

(60) Provisional application No. 62/090,245, filed on Dec. 10, 2014.

(51) Int. Cl.
| | |
|---|---|
| *E04D 13/18* | (2014.01) |
| *E04H 14/00* | (2006.01) |
| *E04D 13/10* | (2006.01) |
| *E04D 13/076* | (2006.01) |

(52) U.S. Cl.
CPC ....... *E04D 13/103* (2013.01); *E04D 13/0762* (2013.01)

(58) Field of Classification Search
CPC .............. E04D 13/0762; E04D 13/103; H05B 2214/02; F24J 2/045
USPC .............................................. 52/586.2, 590.2
See application file for complete search history.

(56) References Cited

U.S. PATENT DOCUMENTS

| | | | | |
|---|---|---|---|---|
| 3,160,249 A | * | 12/1964 | Pavlecka ................ | B62D 27/06 24/30.5 S |
| 4,111,188 A | * | 9/1978 | Murphy, Jr. ............. | F24J 2/045 126/622 |
| 4,221,208 A | * | 9/1980 | Murphy, Jr. ............. | F24J 2/045 126/622 |
| 4,258,703 A | * | 3/1981 | Reitmaier ................ | E04D 3/32 126/623 |
| 4,738,247 A | * | 4/1988 | Moore ...................... | E04D 3/30 126/622 |
| 5,609,435 A | * | 3/1997 | Nomura .................. | F16B 5/002 403/294 |
| 6,079,170 A | * | 6/2000 | Slebos ..................... | F24J 2/045 52/220.1 |
| 2006/0288652 A1 | * | 12/2006 | Gurr ...................... | E04D 13/103 52/198 |
| 2011/0297662 A1 | * | 12/2011 | Clark .................... | E04D 13/103 219/213 |

(Continued)

*Primary Examiner* — Brian Mattei
(74) *Attorney, Agent, or Firm* — Boyle Fredrickson, S.C.

(57) ABSTRACT

A heat panel system for preventing ice formation about a roof or gutter includes at least two heat panels that are connected using a fastener. The heat panels each include a body including at least one channel configured to accept a heating element. Tongues and grooves or other mating arrangements on the panels and the fastener permit two panels to be joined by a fastener so as to inhibit relative lateral movement and enhance heat transfer between panels. A single panel or a multi-panel system can be mounted directly on the roof, and/or a single panel system can be mounted in a gutter. By using these heat panels and fasteners, heat panel systems of varying widths can be made using the same supplies.

14 Claims, 5 Drawing Sheets

(56) References Cited

U.S. PATENT DOCUMENTS

2015/0176619 A1* 6/2015 Baker ................. E04F 13/0894
52/586.2

* cited by examiner

HEAT PANEL AND FASTENER SYSTEM

CROSS-REFERENCE TO RELATED APPLICATION

The present application claims priority on U.S. Provisional Patent Application Ser. No. 62/090,245, filed Dec. 10, 2014 and entitled Armour Lock Connecting Heat Panel, the entirety of which is hereby incorporated herein by reference.

BACKGROUND OF THE INVENTION

1. Field of the Invention

The present invention relates to heating panels, which are placed on a roof or in a rain gutter located adjacent to the roof of a building to prevent formation of ice in or around the gutter.

2. Discussion of the Related Art

A common problem with rain gutters, eaves, valleys, sky lights, and other areas of a roof is that they can experience problems when freezing temperatures are encountered. For instance, water can collect in a gutter or on a roof, which then freezes and causes backups to occur. Once water begins to freeze, additional snow or water can collect and freeze along or adjacent to roof and the gutter. This issue can be exacerbated by runoff that results from the melting of snow and ice on the roof, which then runs down into the relatively cold gutter and re-freezes. As a result, ice dams may form in and around the gutter and on the roof. Further still, when the functionality of a gutter is compromised, large icicles can form on the outer surface of the gutter or up onto the roof. These icicles contribute significant weight to the gutter and the roof.

To avoid the freezing effects discussed above, various deicing devices are available that utilize electrical heating elements such as a wire or coil. The heating element can be mounted to the gutter, to a gutter guard the lies across the gutter, beneath the roofline, or on the roof itself. Assuming the gutter is metallic, the heat will be transmitted throughout the gutter to thaw any ice buildup and prevent further freezing.

In the past, a single heat panel containing an electrical heating element could be used to prevent ice formation. Different heat panel sizes were manufactured in order to accommodate deicing of various areas around the gutter or roof. Alternatively, in areas that required deicing that exceeded the width of a single heat panel, multiple heat panels could be used simultaneously. The multiple heat panels could be abutted against one another to encourage heat transfer amongst the heat panels. While effectively reducing the amount of ice formation in and around a gutter or a roof, there are several disadvantages to these systems.

For example, offering heat panels of varying sizes would require the manufacture and storage of different-sized heat panels. This increases the cost of production, storage, and distribution.

Additionally, where multiple heat panels are abutted against one another, there is risk that the heat panels can be displaced apart from one another, effectively preventing heat transfer from one heat panel to another. This can result in reduced efficiency and higher heating costs.

Thus, there remains room for improvement in heating panels for use in a gutter or about a roof by providing a system that uses a single heat panel configuration while accommodating different areas that need to be deiced.

Additionally, there is need for a fastener that can be used to connect multiple heat panels together while maximizing the efficiency of heat transfer among the heat panels.

There is additionally a need for providing an improved technique for heating gutters and roofs.

SUMMARY OF THE INVENTION

In accordance with an aspect of the present invention, one or more of the above identified needs are met by providing a heat panel system that includes at least two heat panels adapted to be supported on a building such as on an eave, valley, or skylight of a roof, with a connector or fastener that connects the heat panels together. Each heat panel may be of substantially identical construction, with a body located between two sides and at least one channel formed within the body to accommodate an electrical heat element. Each of the heat panels may have mating components, for instance slots formed on either of the two sides. Similarly, the fastener may have mating components located on either side that engage the mating components of the heat panels. For instance, each fastener mating component may be a tongue that engages a slot or groove in the associated heat panel. The resulting connection between the heat panels and fastener inhibits relative lateral movement of the heat panels, and also supplies a continuous heat transfer path between the heat panels.

In accordance with another aspect of the present invention, one or more of the above-identified needs are met by providing a method of assembling a heat panel system includes inserting an electrical heat element into a channel located within at least one panel, affixing a first side of a connector or fastener to a first panel and a second side of the fastener to a second panel, and installing the heat panel system on or near a roof of a building. To affix the fastener to the panels, the fastener may be slid along the length of the panels. The resulting heat panel system allows a single heat panel configuration to be used to heat areas of varying widths. For instance, two panels may be connected using one fastener, three panels may be connected using two fasteners, or four panels may be connected using three fasteners.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention include all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
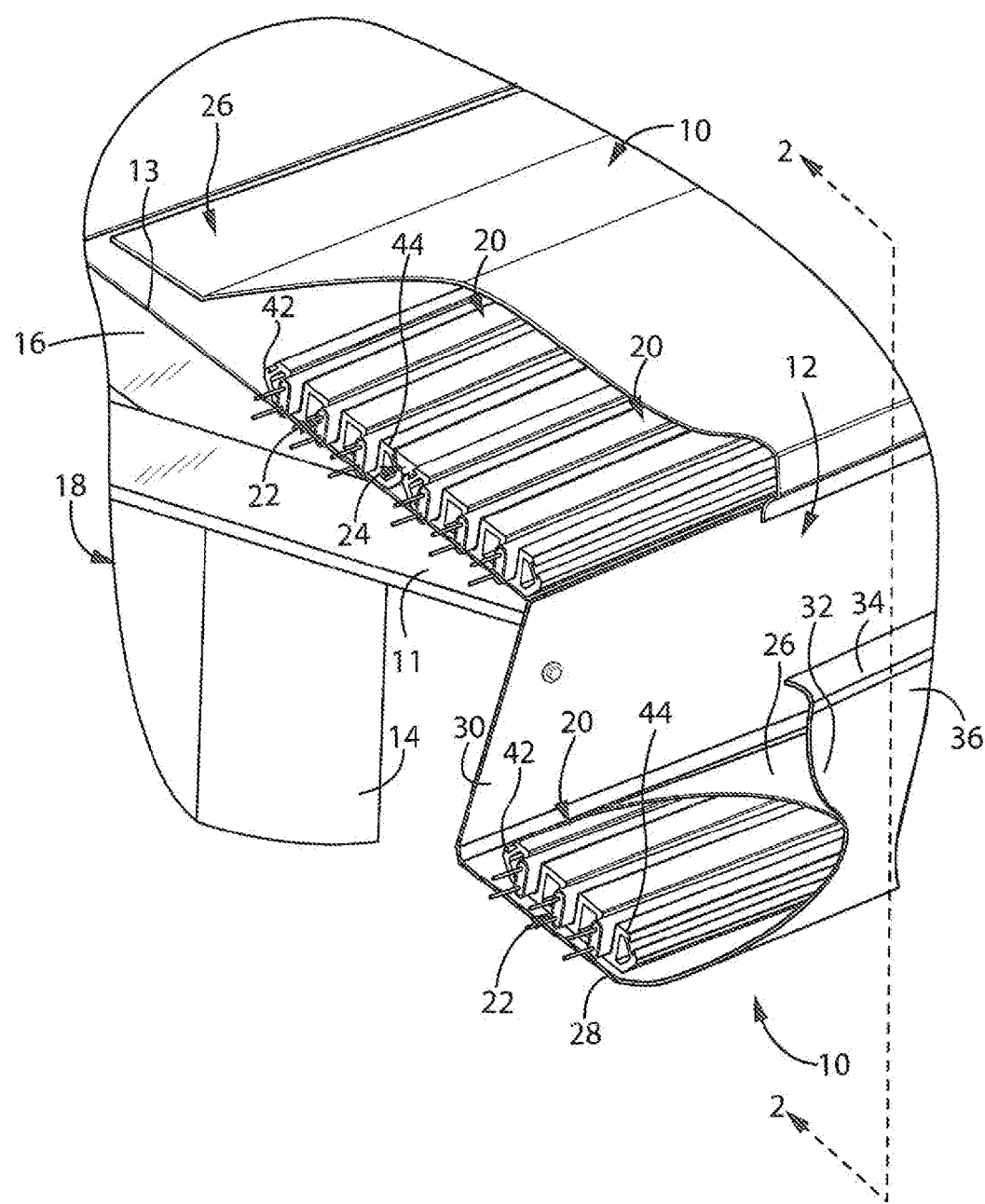
FIG. 1 is a partially cut away top perspective view of a gutter heat panel system constructed in accordance with the invention and installed on an eave of a roof and in a gutter.
Figure 2:
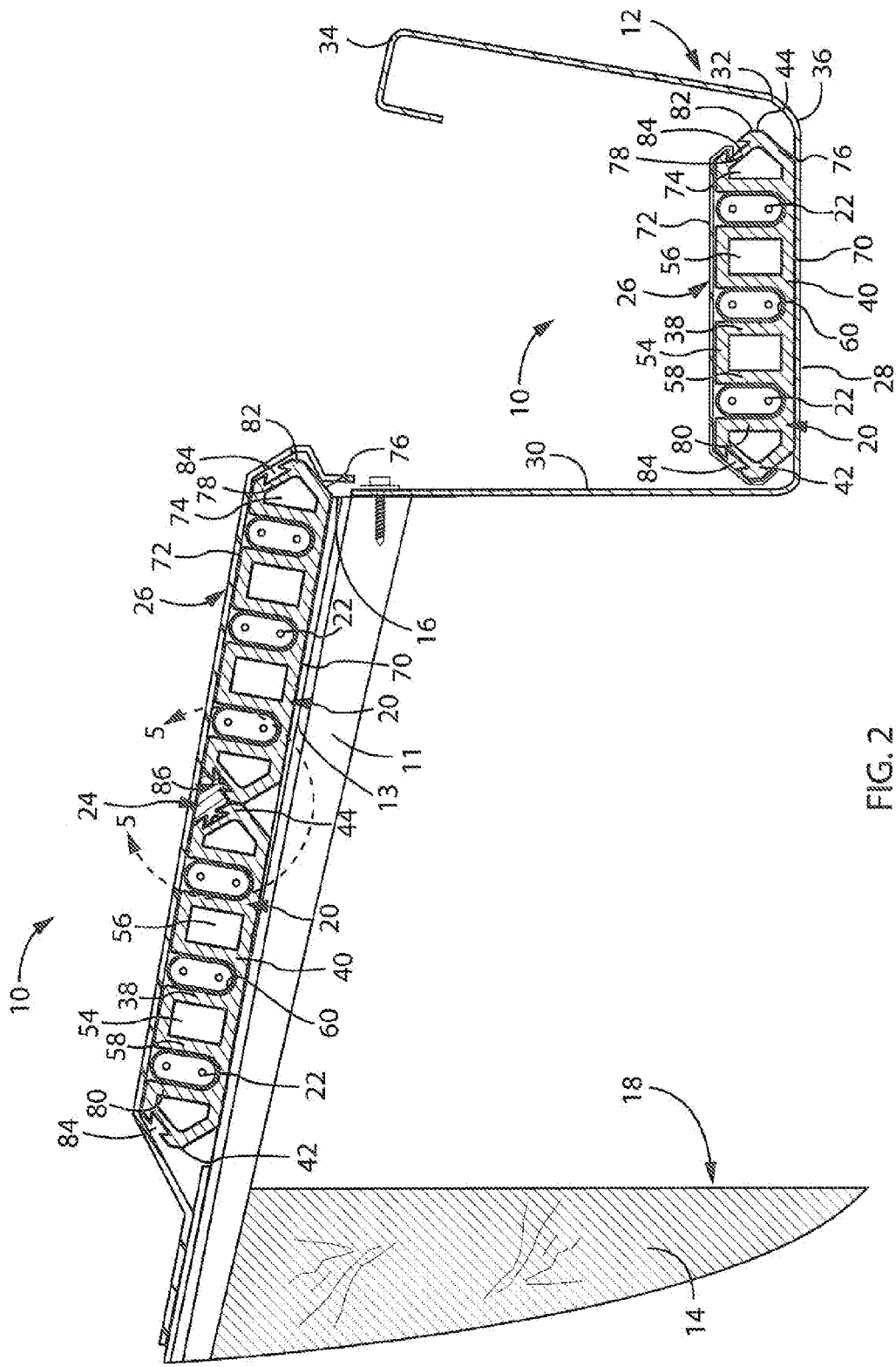
FIG. 2 is a cross sectional end elevation view of the heat panel and fastener system of FIG. 1.

Referring now to the drawings and initially to FIGS. 1 and 2, a heat panel and fastener system 10 or simply "heat panel system" as placed along an eave 11 is shown. The eave 11 extends outwardly from the roof 16 such that the eave 11 provides an overhang relative to a fascia 14 that extends downwardly from a roof 16 of a building 18.

A gutter 12 hangs adjacent to the eave 11 to collect condensation dripping down the roof 16 onto the eave 11. The gutter 12 may take any of a number of configurations including those commonly known in the art. The exemplary gutter 12 shown in FIGS. 1 and 2 is generally trapezoidal in transverse cross section and includes the bottom 28, an inner wall 30 positioned adjacent the fascia 14, and an outer wall 32 having an upper lip 34. The inner wall 30 typically extends substantially vertically, while the outer wall 32 generally is inclined upwardly away from the outer edge 36 of the bottom 28 of the gutter 12. The gutter 12 is mounted on the eave 11 by brackets or hangers, not shown. Various gutter configurations may be used, for instance the illustrated gutter 12 is approximately 5" to 6" wide at its upper end and about 5" to 6" deep, although wider gutter configurations may be used to increase the volume of moisture that can be transported to the ground through the gutter system.

The heat panel system 10 includes a number of heat panels 20, as shown two heat panels 20, at least one heating element 22, and a connector or fastener 24 that connects the heat panels 20 together. The heat panel system 10 may additionally include a cover 26 that snaps over the heat panels 20 and the fastener 24. The assembled heat panel system 10 rests on a top 13 of the eave 11 and extends longitudinally along the eave 11.

Looking now to FIGS. 1, 2, 3, and 5 the heat panel system 10 of the illustrated embodiment as mounted on the eave 11 includes two heat panels 20 of identical construction connected together using a fastener 24. Additional panels 20 could be added to the system 10 as mounted on the eave 11 using additional fasteners 24. A single heat panel configuration can be used to supply heat to a variety of different surface areas on or about roof 16 that may be prone to ice formation. For example, instead of or in addition to being mounted on an eave, a single-panel or multi-panel system could be mounted along a valley or on a skylight. A single panel 20 also may be used to heat the gutter 12, also as shown in FIGS. 1 and 2. Individual panels 20 or multi-panel systems 10 also could be used to heat floors, such as by being mounted to a basement ceiling.

In addition to permitting the effective width of the heat panel system to be extended, the fastener improves the heat transfer efficiency amongst the heat panels 20 by assuring that a thermally conductive "bridge" is maintained between adjacent panels 20 along the entire length of the panels 20.

The heat panel 20 and fastener 24 will now be described with some exemplary, non-limiting, dimensional descriptions. It should be noted that alternative heat panel 20 and fastener 24 configurations could be used depending on the size of the eave 11 or area to which heat is being supplied, the materials being used, and the preference of the designer.

Looking to FIGS. 1 and 2, a two-panel heat panel system is shown resting on the top 13 of the eave 11 and abutting the gutter 12. Another, stand-alone panel 20 is shown as resting in the gutter 12. Each of the panels 20 is of identical construction. The heat panel 20 is formed of a rigid thermally conductive, likely metallic material such as an extruded aluminum alloy or stamped sheet metal. It may be formed in relatively long sections each having a length of, for instance, five, six, or eight foot long. Panel 20 includes a body 38 with a substantially flat bottom 40, a first side 42, and a second side 44 opposite the first side 42, all of which extend longitudinally of the heat panel system 10. In the illustrated embodiment, the heat panel 20 may be between 2.5-3.0 inches in width, and more preferably 2.75 inches. The first side 42 and second side 44 are each tapered downward, such that the width of the bottom 40 of the heat panel 20 are between 2.0 inches and 2.50 inches, and more preferably 2.20 inches. The height of the panel 20 may be between 0.590 and 0.670 inches, and more preferably 0.630 inches.

Figure 5:
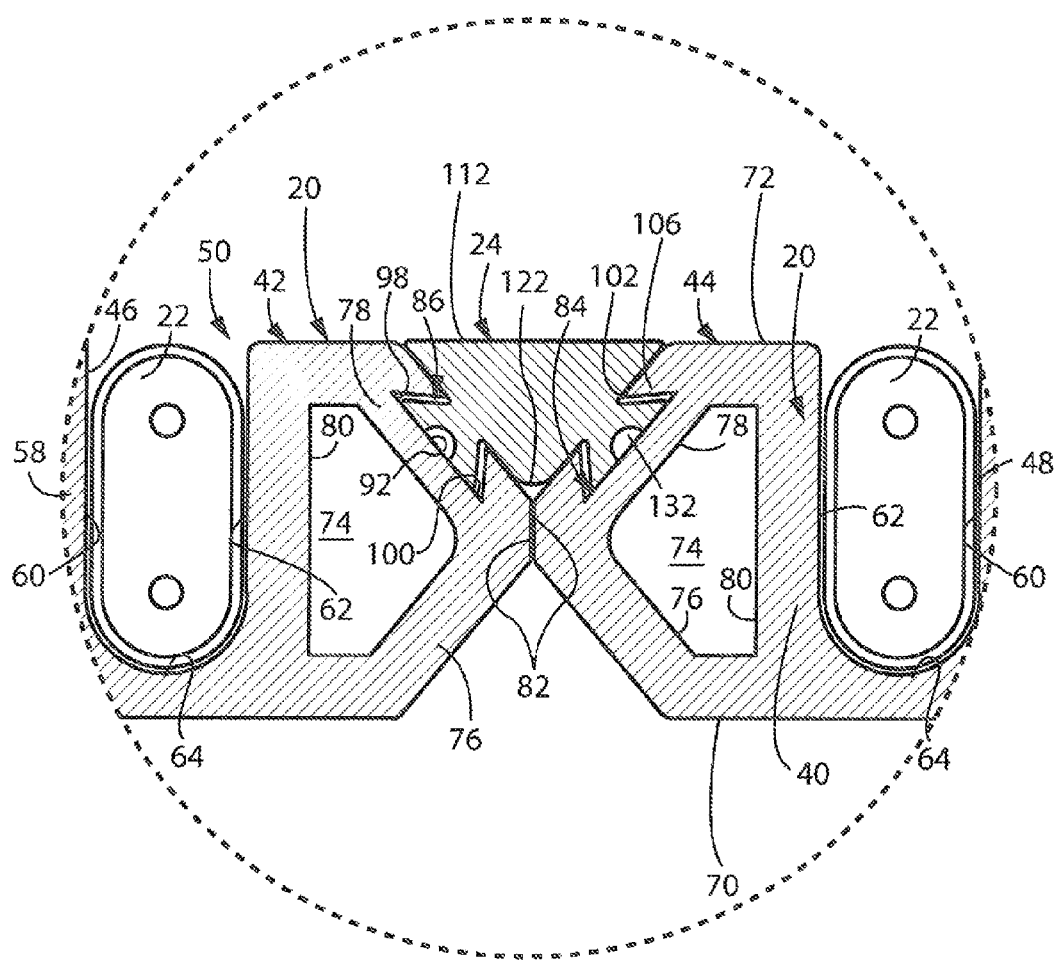
FIG. 5 is a detailed cross sectional end elevation view of a portion of the heat panel and fastener system taken generally along line 5-5 in FIG. 2 with the cover removed.

A plurality (three in the illustrated embodiment) of open channels 46, 48, 50 extend longitudinally of the heat panel 20 between the first side 42 and the second side 44. The inboard-most channel 48 and outboard-most channel 50 are located adjacent the respective first and second sides 42, 44 of the panel 20. The intermediate channel 46 is separated from the other two channels 48, 50 by first and second generally rectangular hollow ribs 54, 56. Referring especially to FIG. 5, the channels 46, 48, and 50 are formed in part by sidewalls 58 of the ribs that extend upwardly from the bottom 40 of the panel 20. Each of these channels 46, 48, and 50 is configured to accept a heating element 22. As shown, each channel 46, 48, 50 has a generally arcuate bottom 64 that extends on either side of the bottom 64 of the channel to opposed sidewalls 60, 62 of the channel. Ideally, the shape of the channel allows the arcuate bottom 64 and opposed sidewalls 60, 62 to maintain continuous contact with the heating element 22. This configuration maximizes the surface area of contact between the heating element 22 and the channel 46, 48, or 50.

While the illustrated embodiment shows three channels 46, 48, 50, it should be noted that the heating panel 20 may include additional or fewer channels based on the heating needs of the panel 20 and design preference. Additionally, each channel 46, 48, or 50 need not receive a heating element 22 at all times.

Each heating element 22 may be an electrically powered heating wire or cable, although other beat sources may be used. In being located directly adjacent to one of the sidewalls 58 of the associated channel, the heating element 22 provides heat throughout the heat panel system 10 due to high conductivity of the panel 20. When using the heat panel 20, a single heating element 22 can be inserted into one of the channels 46, 48, or 50, or multiple heating elements 22 can be inserted into more than one of the channels 46, 48, or 50 depending on the desired heating effect.

As mentioned above, first and second hollow ribs 54, 56 separate the intermediate channel 46 from the inner and outer channels 48, 50. One of these ribs 54 is located between the first and second channels 46 and 48, and the other rib 56 is located between the first and third channels 46 and 50. Each of the ribs 54, 56 extends longitudinally the entire length of the panel 20. The illustrated closed ribs 54, 56 are substantially rectangular in shape with a bottom wall 66, opposed sidewalls 58 that are shared with adjacent channels and a top wall 68. Additionally, a scour line 55 may be formed in the underside of the bottom wall 66 in the middle of each rib 54, 56. The scour line 55 serves as a marker that allows a user to align fasteners (not shown) with the heat panel 20 prior to installation as will further be described below. The sidewalls 58 extend substantially perpendicular upwardly from the bottom wall 66 or vertically when the panel 20 is installed in the gutter 12. The top wall 68 extends substantially perpendicular from one of the sidewalls 58 to the adjacent sidewall. The resulting ribs 54, 56 provide the heat panel 20 with increased strength across the panel 20.

Figure 3:
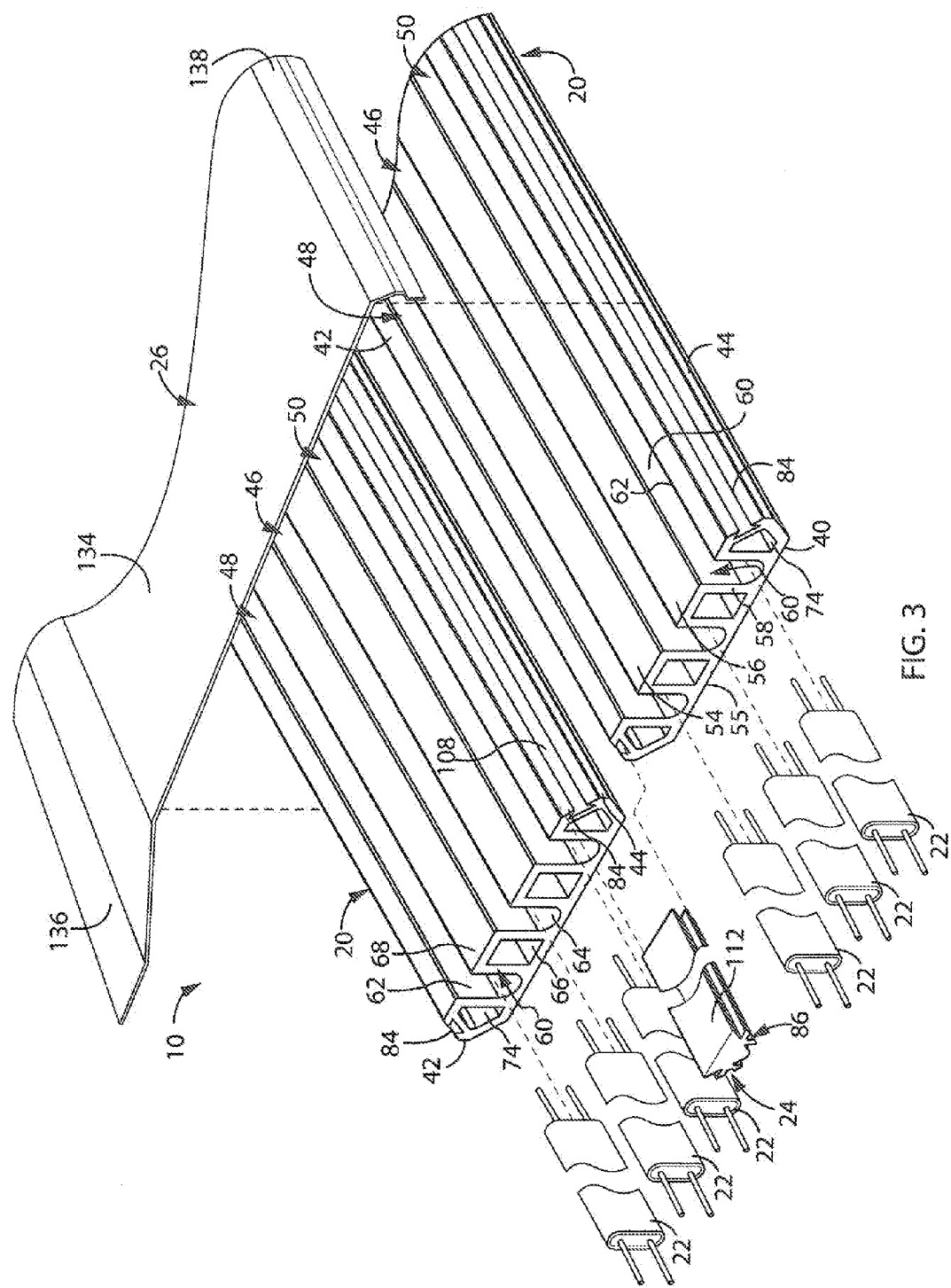
FIG. 3 is an exploded isometric view of the heat panel and fastener system of FIG. 1.

Referring to FIGS. 2, 3, and 5 in the illustrated, embodiment, both the first side 42 and the second side 44 of the heat panel 20 include an enclosed channel 74 that is substantially triangular when viewed in transverse cross section. Channel 74 is bordered at its outside by a lower inclined wall 76 and an upper inclined wall 78, and is bordered at its inside by a vertical wall 80 of the outboard-most channel 50. The ribs 54, 56 and enclosed channels 74 help to facilitate effective between adjacent heat panels. They also strengthen the heat panel 20.

Turning to FIGS. 2 and 5, the lower inclined wall 76 of each enclosed channel 74 extends upwardly from the bottom 40 and outwardly away from the channels 46 of the heat panel 20. The lower inclined wall 76 extends at an angle between 45-65 degrees, and more preferably 55 degrees upwardly and outwardly from the bottom 40. The lower inclined wall 76 ends in a vertical ridge 82, which extends substantially vertically from the lower inclined wall 76 for a height of preferably between 0.080 inches and 0.120 inches, and more preferably approximately 0.100 inches. This vertical ridge 82 abuts the vertical ridge 82 of an adjacent panel 20 upon assembly, enhancing heat transfer between panels 20.

The upper inclined wall 78 extends upwardly from the vertical ridge 82 and inwardly toward the center of the heat panel 20. The upper inclined wall 78 may extend at an angle between 35-55 degrees, and more preferably 45 degrees upwardly and inwardly from the vertical ridge 82. The thickness of the upper inclined wall 78 may be between 0.050-0.070 inches, and more preferably 0.061 inches.

Referring to FIGS. 3 and 5, each of the first side 42 and second side 44 of the heat panel 20 may additionally feature a mating component 84 configured to be engaged by a mating component 88 of a fastener 24. These mating components 84, 86 take the form of a tongue and groove configuration in this embodiment. Specifically, a slot or groove 84 is formed in the heat panel 20 for receiving a tongue 86 or lug on the fastener 24. Alternatively, in another configuration (not shown) the grooves could be provided on the fastener 24 and the tongues could be provided on the panels 20. In the illustrated embodiment, each side of the heat panels 20 has a slot or groove 84 formed therein for mating with a lug or tongue 86 in the fastener. Each mating tongue and groove mate to form a joint that prevents significant relative lateral movement between the panel 20 and the fastener 24. That joint is a dovetail joint in the present embodiment, though any of a variety of other types of joints could be employed as well.

More specifically, the grooves 84 are formed into the upper inclined wall 78. Referring to FIG. 5, each groove 84 has an inner wall 92 and two inclined outer walls 94, 96 that extend upwardly from opposed ends 98, 100 of the inner wall 92 and converge towards the centerline of the groove 84 but terminate short of one another to form an outer opening 102. For instance, the inner wall 92 may have a length between 0.220 inches and 0.260 inches, and more preferably a length of approximately 0.240 inches. The outer opening 102 may have a length between 0.100 inches and 0.120 inches, and more preferably a length between 0.106 inches and 0.112 inches. The outer opening 102 of the groove 84 thus is substantially shorter than the inner wall 92. As a result, when the groove 84 receives a similarly-shaped tongue 86 on the fastener 24, the tongue 86 locks into the groove 84 and cannot be pulled transversely out of the groove 86. As shown the inclined outer walls 94, 96 extend at an angle between 35-55 degrees, and more preferably 45 degrees, upwardly and inwardly from the groove inner wall 92 towards the opposite inclined outer wall 96, 94. The height of the groove 84 is between 0.055 inches and 0.075 inches, and more preferably approximately 0.065 inches. The inclined outer walls 94, 96 end at the outer edge 104 of the upper inclined wall 78 where a tooth 106 is formed on either side of the groove 84. Of course, the heat panel 20 could feature alternative mating arrangements configured to engage the fastener 24 resulting in a tight connection between adjacent heat panels 20.

Figure 4:
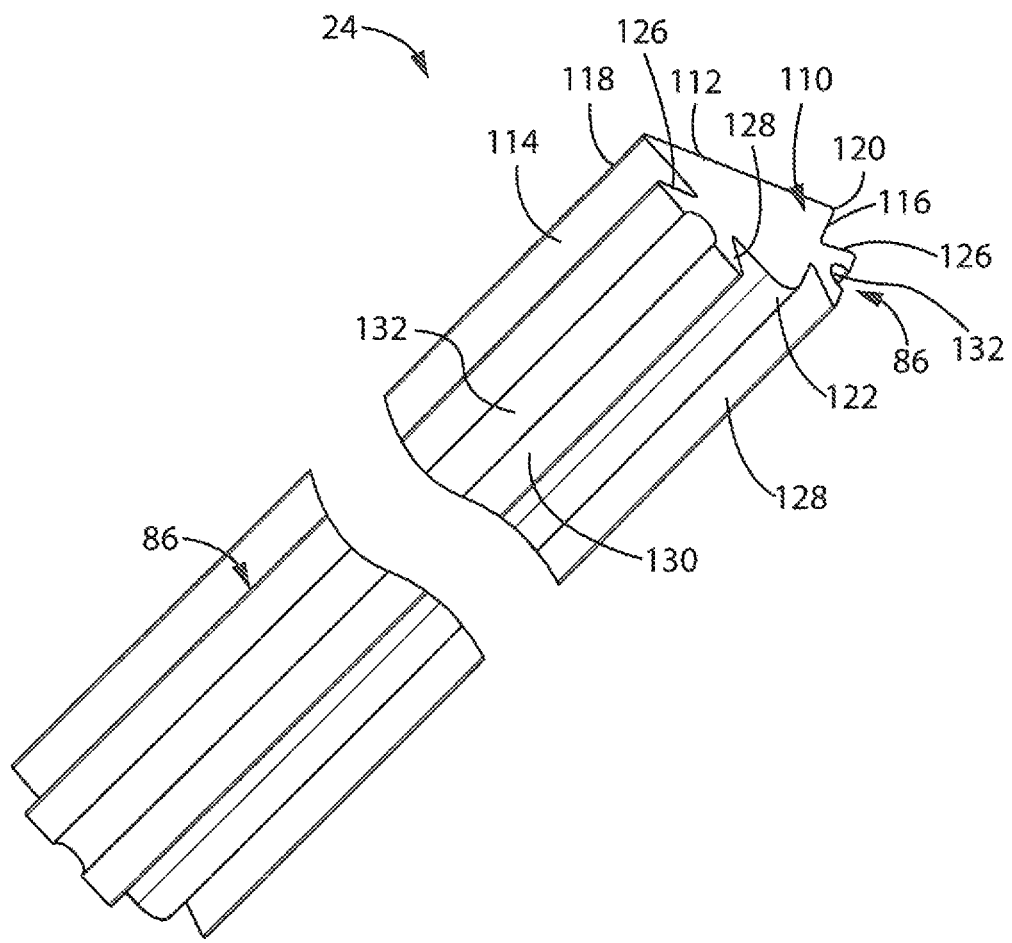
FIG. 4 is an isometric bottom view of the fastener of the heat panel and fastener system of FIG. 1.

Alternatively, adjacent heat panels 20 can be locked together using a connector or fastener 24 that bear a tongue 86, as shown in isolation in FIGS. 4 and 5. Each fastener 24 may be made of the same material as the heat panels 20, or at least should be made of a material having coefficient of thermal expansion comparable to that of the heat panels 20. The fastener 24 also is preferably of the same length as the heat panels 20. The illustrated fastener 24 is substantially symmetrical about a longitudinal centerline thereof so that the fastener 24 can establish an identical connection with each of two adjacent heat panels 20. The fastener 24 is substantially triangular in shape when viewed in transverse cross section. It includes a body 110 with a horizontal top surface 112 and two sidewalls 114, 116 located on a first side and a second side of the fastener. The top side 112 is substantially planar, and is between 0.30 and 0.50 inches in length, and more preferably between about 0.40 inches. The two sidewalls 114, 116 converge downwardly and inwardly from opposed edges 118, 120 of the top surface 112 to a bottom tip 122. The two sidewalls 114, 116 can converge at various angles depending on the size and location of the grooves 86 and corresponding sides 42, 44 of each heat panel 20. For instance, the illustrated sidewalls 114, 116 extend at an angle between 35 and 55 degrees, and more preferably of 40 degrees downwardly and inwardly from the top side 112 to the bottom tip 122. The sidewalls 114, 116 may be between 0.280 inches and 0.310 in length, and more preferably approximately 0.295 inches in length. The resulting fastener 24 has a total height from the top side 112 to the bottom tip 122 of approximately 0.20-0.25 inches, and more preferably between 0.23 inches. The angle separating the first sidewall 114 and the second sidewall 116 at the bottom tip 122 may be between 70 degrees and 90 degrees, and more preferably approximately 80 degrees. The bottom tip 122 may be curved, as shown with a radius of approximately 0.045 inches.

Each sidewall 114, 116 additionally bears one of the tongues 80 configured to engage a mating groove 84 of the heat panel 20. Each tongue 86 extends outwardly from the outer face of the sidewall 114, 116 for mating with the slot or groove 84 in the adjacent heat panel 20. The tolerances of the fastener 24 and the heat panel 20, and more specifically the groove 84 and the tongue 86, allow the tongue 86 to slide longitudinally along the length of the groove 84 during assembly while minimizing the amount of transverse movement between the components once the fastener 24 and heat panels 20 have locked together. As mentioned above, in order to prevent significant lateral movement between the panel 20 and the fastener, each tongue and groove set forms a dovetail joint. In addition to securing two adjacent heat panels 20 together, the fastener 24 maintains a heat transfer path between the two adjacent heat panels 20 along the entire length of the panels 20. As a result thermal transfer between the heat panels 20 and the fasteners 24 is enhanced.

Referring to FIGS. 4 and 5, the cross sectional size and shape of the tongue 86 essentially matches that of the corresponding groove 84, with some accommodation for tolerances to inhibit binding during assembly. The tongue 86 is substantially symmetrical about a centerline thereof and includes two sidewalls 126, 128 that extend outwardly and away from the fastener sidewall 114, and an outer edge 130. The tongue sidewalls 126, 128 extend at an angle between 35-55 degrees, and more preferably 45 degrees outwardly from the fastener sidewall 114, and away from the tongue 86 center line. Each of the sidewalls 126, 128 may extend angularly from the fastener sidewall 114, 116 through a distance of between 0.080 inches and 0.100 inches, and more preferably approximately 0.090 inches before terminating into the outer edge 130. As a result, the total distance between the fastener sidewall 114, 116 and the outer edge 130 may be between 0.055 and 0.075 inches, and more preferably between 0.061 inches and 0.067 inches. The total width of the outer edge 130 may be between 0.165 and 0.190 inches, and more preferably between 0.174 inches and 0.180 inches.

The outer edge 130 of each sidewall 114 has a semicircular groove 132 formed in, and centered about, the tongue 86. The illustrated semi-circular groove 132 has a radius of approximately 0.030 inches, although different sized or shaped grooves could be used as desired. The groove 132 permits some flexing of the tongue 86 toward the centerline of the groove 132, inhibiting binding of the tongue 86 within the slot or groove 84 during assembly.

Once the heat panels 20 and fasteners 24 have been assembled, a cover 26 may be installed to the heat panel system 10. This cover 26 overlies the heat panels 20, heating elements 22, and fastener 24 as can best be seen in FIG. 3. The cover 26 is configured to tightly fit over the heat panel system 10 such that heat transmitted throughout the system 10 is also transferred to the cover 26. Like the heat panel 20 and the fastener 24, the cover 26 is preferably made of a thermally conductive material such as aluminum to allow for heat transfer from the heating element 22. It may also be colored to match or generally match the color of the surface on which the system 10 is installed or to otherwise satisfy the preference of the building owner.

The cover 26 has a flat base 134 with a first end 136 located on the first side 42 and a clip 138 located on the second side 44 opposite the first side 42. The first end 136 extends away from the system 10. As a result, when the system 10 is installed about the eave 11, the first end 136 extends onto the roof 16. The clips 138 may be configured to snap over the vertical ridge 82 and part of the lower inclined wall 76 of a panel 20, for instance as shown FIGS. 1-3. Alternatively, the clips may be configured to snap over the tooth 106 of the groove. While the illustrated embodiment only has one clip 138, other configurations of the cover could have a second clip located where the first end 136 is located. In this embodiment, the cover 26 could feature the first snap configuration on both sides, the second snap configuration on both sides or one side having the first snap configuration and the other side having the second snap configuration. Although the illustrated embodiment features a cover 26 that snaps onto the heat panel system 10, the cover 26 could also be attached or connected to the heat panel system 10 in ways known in the art, for instance, by using screws, bolts, clips, rivets, nails, set-screws, tape, glue, adhesive, and the like.

A multi-panel heat panel system 10 can be assembled by first inserting electrical heat elements 22 into at least one channel 46, 48 or 50 of at least one panel 20. As discussed above, heat elements 22 could be introduced into more than one channel to increase the amount of heat supplied to the heat panel system 10. Next, a first side 140 of the fastener 24 is affixed to a first heat panel 20. A second side 142 of the fastener 24 can then be affixed to a second heat panel 20. In the illustrated embodiment, the fastener 24 is slid along the length of the first panel and second panel 20, preferably using a fastener 24 with a first tongue 86 and a second tongue 86 located on opposite sides 140, 142 of the fastener 24, each tongue 86 engaging a groove 84 formed on a respective side 42, 44 of each respective panel 20. Alternatively, the fastener 24 could be snapped, clipped, connected using fasteners, or attached using other techniques known to those of ordinary skill in the art.

Finally, the heat panel system 10 can be installed about a portion of the roof 16 of a building 18. More specifically, as shown the heat panel system 10 is placed onto the top 13 of the eave 11 in this embodiment. The heat panel, system 10 can be installed by determining a mounting location that is laterally offset from the channel 46, 48, or 50, using a marker formed in or on the heat panel 20. The marker may be a longitudinally-extending scour line 55 on the bottom 40 of the heat panel 20 that is laterally offset from the channel. Once the mounting location is determined, a hole (not shown) can be drilled into the panel 20 from below, and a screw (not shown) can be driven through the hole from above, through the panel 20, and into the eave or other underlying structure. Relative lateral movement between the adjacent panels 20 of the assembled system 10 is prevented by the locking of the tongues 86 on the fastener in the grooves 84 in the panels 20. Conductive transfer between the panels 20 is facilitated through direct contact between the connector 24 and both panels 20 and by direct contact between the panels 20 at the mating vertical ridges 82 beneath the fastener 20.

The installation of the heat panel system 10 can vary depending on where the heat panel system 10 is being mounted. For instance, the heat panel system 10 can simply be placed in a gutter 12 as shown in FIGS. 1 and 2. Alternatively, a single panel or multi-panel system 10 can be mounted to an eave 11 by drilling a hole into the panel 20 and securing the system 10 to the eave 11 using screws or the like. Alternatively still, the system may be glued into place. For instance, when mounted to a valley (not shown), the heat panel system 10 may be glued to the top surface of the roof 16.

As a result of the configuration of the heat panel 20 and fastener 24, different sized heat panel systems 10 can be created using a single heat panel configuration and a single fastener configuration. This provides benefits in that manufacturers only need to manufacture a single heat panel 70 and a single fastener 24, while offering heat panel systems 10 that meet the needs of specific customers. This is also beneficial for distributors, who can supply heat panel systems 10 to a variety of customer types while minimizing the amount of shelf space needed to accommodate differently dimensioned heat panel systems 10. As shown in FIGS. 1-3, two heat panels 20 could be connected using a fastener 24 to heat the top surface 13 of an eave 11 that is more than 5.50 inches wide, but less than 8.25 inches wide. Alternatively, three heat panels could be connected using two fasteners to heat spaces that are more than 8.25 inches wide, but narrower than 11.0 inches wide. Alternatively still, four panels could be connected together using three fasteners to heat spaces that are more than 11.0 inches wide. Additional panels could be installed as desired.

It should be understood that the components of the system may be made of any number of different materials. As stated herein, it is preferred that many of these components are made of heat-conductive materials, such as extruded aluminum. Other materials could be used to improve the durability, strength, or conductivity of the component. Preferably, the various components are made using materials with similar coefficients of thermal expansion to prevent buckling or failure of the system when expansion or contraction of the various components occurs. Additionally, while the above description outlines possible was of engaging or connecting the various components, it should be noted that any of the components can be attached to one another using screws, bolts, clips, rivets, nails, set-screws, tape, glue, adhesive, and the like.

Additionally, it should be understood that the various inventive features described above can each be used independently of one another or in combination with other features.

It is appreciated that many changes and modifications could be made to the invention without departing from the spirit thereof.

For example, all dimensions, proportions, and materials described as "preferred" above are "preferred" only in conjunction with specific embodiments disclosed herein, and the invention as defined in the claims is by no means remotely limited to the described dimensions, proportions, or materials.

Other changes will become apparent from the appended claims. It is intended that all such changes and/or modifications be incorporated in the appending claims.

The invention claimed is:

1. A system for the prevention of ice formation on or near a roof of a building the system comprising:
    at least two panels adapted for being supported on the building;
        wherein each of the panels extend longitudinally of the system;
        wherein each of the panels has a first side edge, a second side edge, and a substantially planar bottom surface that extends laterally between the first side edge and the second side edge;
        wherein each of the panels has at least one up upwardly-facing, longitudinally-extending channel that is located laterally between the first side edge and the second side edge above the substantially planar bottom surface, that is open at an upper surface thereof, and that is configured to accommodate an electrical heat element; and
    a fastener adapted to lock the at least two panels together;
        wherein the fastener is formed of a metallic material and is designed to engage both of the first and second panels in abutting relationship along at least a substantial portion of an entire length thereof so as to enhance heat transfer from one panel to another while inhibiting relative transverse movement between the panels.

2. The system of claim 1 wherein the fastener comprises at least two fastener mating components, each, fastener mating component configured to engage a mating component of each of the at least two panels.

3. The system of claim 2, wherein each panel has plural upwardly-facing channels.

4. The system of claim 1, wherein each of the panels has a groove one of the side edge thereof that faces a side edge of the other of the two panels; wherein the fastener has two tongues extending outwardly from opposed sides of the fastener; and wherein each of the grooves is configured to engage a respective one of the tongues to prevent lateral movement between the panels and the fastener.

5. The system of claim 1, wherein each of the panels has a tongue in a side edge thereof that faces the other of the two panels; wherein the fastener has two grooves formed in opposed sides of the fastener; and wherein each of the two grooves are configured to engage a respective one of the tongues.

6. The system of claim 4, wherein the fastener provides a continuous heat transfer path between the at least two panels along entire lengths thereof.

7. The system of claim 4, wherein the tongues and the grooves mate to forma dovetail joint extending the length of the panel.

8. A system for the prevention of ice formation on or near a roof of a building the system comprising:
    first and second panels adapted to be supported on or near the roof, each panel comprising:
        a first side, a second side opposite the first side, a body located between the first side and the second side, and at least one channel located within the body, all of which extend longitudinally of the roof, and
        a panel mating arrangement associated with one of the first side and the second side;
    a fastener comprising:
        a first side and a second side opposite the first side; and
        first and second fastener mating arrangements located on the respective first and second sides of the fastener, wherein the first and second fastener mating arrangements engage with the panel mating arrangement of one of the first and second panels; and
    at least one heating element inserted into one of the channels to provide heat throughout the first and second panels.

9. The system of claim 8, wherein each of the at least two panels are of substantially identical construction.

10. The system of claim 9, wherein:
    a first panel and a second panel are secured together by a first fastener; and
    the second panel and a third panel are secured together using a second fastener.

11. The system of claim 10, wherein:
    the third panel and a fourth panel are secured together using a third fastener.

12. The system of claim 9, wherein each panel accommodates multiple laterally-spaced electrical heat elements.

13. The system of claim 12, wherein the panel mating arrangement of the first panel is a groove in an edge of the first side and the panel mating arrangement of the second panel is a groove in an edge of the second edge, and wherein the first and second fastener mating arrangements are a first tongue extending from the first side and a second tongue extending from the second side.

14. The system of claim 13, wherein each of the grooves is configured to engage a respective one of the first tongue and second tongue and to prevent lateral movement of the two panels.

* * * * *

UNITED STATES PATENT AND TRADEMARK OFFICE
CERTIFICATE OF CORRECTION

PATENT NO. : 9,765,526 B2
APPLICATION NO. : 14/964802
DATED : September 19, 2017
INVENTOR(S) : Breyer et al.

Page 1 of 1

It is certified that error appears in the above-identified patent and that said Letters Patent is hereby corrected as shown below:

In the Claims

Claim 1, Line 11　　　Remove "up" after "one"
Column 9, Line 48

Claim 2, Line 2　　　Remove "," after "each"
Column 9, Line 64

Claim 7, Line 2　　　Add a space between "form" and "a" in "forma"
Column 10, Line 20

Signed and Sealed this
Seventh Day of November, 2017

Joseph Matal
*Performing the Functions and Duties of the
Under Secretary of Commerce for Intellectual Property and
Director of the United States Patent and Trademark Office*